United States Patent [19]

Mitchell

[11] Patent Number: 4,676,316
[45] Date of Patent: Jun. 30, 1987

[54] METHOD AND COMPOSITION FOR OIL RECOVERY BY GAS FLOODING

[75] Inventor: Thomas O. Mitchell, Pennington, N.J.

[73] Assignee: Mobil Oil Corporation, New York, N.Y.

[21] Appl. No.: 798,663

[22] Filed: Nov. 15, 1985

[51] Int. Cl.$^4$ ............................................. E21B 43/22
[52] U.S. Cl. .................................. 166/274; 166/273; 166/272
[58] Field of Search ................ 166/275, 274, 273, 272

[56] References Cited

U.S. PATENT DOCUMENTS

| | | |
|---|---|---|
| 3,421,582 | 1/1969 | Fallgatter . |
| 3,525,395 | 8/1970 | Chew . |
| 3,525,396 | 8/1970 | Chew . |
| 3,599,716 | 8/1971 | Thompson . |
| 3,719,606 | 3/1973 | Froning et al. . |
| 3,811,502 | 5/1974 | Burnett . |
| 3,844,350 | 10/1974 | Knight et al. . |
| 3,927,716 | 12/1975 | Burdyn et al. . |
| 4,008,766 | 2/1977 | Savins . |
| 4,266,611 | 5/1981 | Bousaid et al. . |
| 4,319,636 | 3/1982 | Kudchadker et al. . |
| 4,335,787 | 6/1982 | Stapp . |
| 4,360,061 | 11/1982 | Canter et al. . |
| 4,415,033 | 11/1983 | Chan et al. . |

Primary Examiner—Stephen J. Novosad
Assistant Examiner—Thomas J. Odar
Attorney, Agent, or Firm—Alexander J. McKillop; Michael G. Gilman; Charles J. Speciale

[57] ABSTRACT

A method and composition for improved enhanced oil recovery of oil from a subterranean hydrocarbon-bearing reservoir by effecting simultaneous mobility and profile control in gas flooding which includes pre-injecting into the reservoir an aqueous solution of a water-soluble polymer in combination with a stable surfactant, followed by injecting a gas into the reservoir under pressure sufficient to effect oil production while recovering oil at a producing well of said reservoir.

11 Claims, No Drawings

METHOD AND COMPOSITION FOR OIL RECOVERY BY GAS FLOODING

BACKGROUND OF THE INVENTION

The present invention relates to the art of recovering petroleum, and, in particular, to the improvements in the art of enhanced oil recovery techniques.

When a well is completed in a subterranean reservoir, the oil present in the reservoir is normally removed through the well by primary recovery methods. These methods include utilizing native reservoir energy in the form of water or gas existing under sufficient pressure to drive the oil from the reservoir through the well to the earth's surface. This native reservoir energy most often is depleted long before all of the oil present in the reservoir has been removed from it. Additional oil removal has been effected by secondary recovery methods of adding energy from outside sources to the reservoir either before or subsequent to the depletion of the native reservoir energy.

Soluble or miscible phase displacement techniques comprise a form of enhanced recovery in which there is introduced into the reservoir through an injection well a fluid or fluids which are soluble in or miscible with the reservoir oil and serve to displace the oil from the pores of the reservoir and drive it to a production well. The soluble or miscible fluid is introduced into the injection well at a sufficiently high pressure that the body of fluid may be driven through the reservoir where it collects and drives the reservoir oil to the production well.

The process of miscible flooding is extremely effective in stripping and displacing the reservoir oil from the reservoir through which the solvent flows. This effectiveness is derived from the fact that a two-phase system within the reservoir and between the solvent and the reservoir oil is eliminated at the conditions of temperature and pressure of the reservoir, thereby eliminating the retentive forces of capillarity and interfacial tension which are significant factors in reducing the recovery efficiency of oil in conventional flooding operations where the displacing agent and the reservoir oil exist as two phases in the reservoir.

More recently, carbon dioxide has been used successfully as a miscible oil recovery agent. Carbon dioxide is a particularly desirable material because it is highly soluble in oil, and dissolution of carbon dioxide in oil causes a reduction in the viscosity of the oil and increases the volume of oil, all of which improve the recovery efficiency of the process. Carbon dioxide is sometimes employed under non-miscible conditions, and in certain reservoirs it is possible to achieve a condition of miscibility at reservoir temperature and pressure between essentially pure carbon dioxide and the oil.

The use of carbon dioxide as a recovery agent by means of a conditional miscible flooding process, where the carbon dioxide miscibly displaces the reservoir oil is described in U.S. Pat. No. 3,811,502 to Burnett.

Other solubility or miscibility agents include nitrogen or light hydrocarbons and mixtures thereof, such as paraffins in the $C_2$ to $C_6$ range, and, in particular, liquid petroleum gas. Recent experience in oil recovery has made carbon dioxide an attractive fluid solubility or miscibility agent since it is more effective at lower pressures and it alleviates the need for natural gas and hydrocarbon solvents, both of which are in high demand.

Gaseous solubility or miscibility agents are also attractive if they are readily adapted to a continuous enhanced oil recovery system in which the injection of fluids into the injection well(s) and production of fluids from the production well(s) can be carried out without shutting in the production well(s) to allow pressure build-up or shutting in the injection well(s) to allow pressure draw-down at the production well(s). In most cases, high pressure is required to achieve miscibility, which, in the case of carbon dioxide, can be about 1000 to 4000 psig to effect direct miscibility with many oil systems. Due to the low viscosity of gas, however, gas injection systems experience early breakthrough and due to reservoir permeability stratification they may have poor injection profiles, resulting in reduced recovery efficiency. One method which has been tried to improve these systems is by alternating injection of water and gas.

In alternating injection of water and gas, the injected water preferentially invades zones previously swept by gas. Ideally, subsequent gas injections are diverted by water to zones not previously swept by the gas. However, since gas has a higher mobility than water, gas fingering occurs by which injected gas is not completely controlled to enter only the zones not previously gas-swept.

Furthermore, since the water is still mobile, and since in regions from which the oil has been removed the permeability to water may be increased, the water-to-oil production ratios may also be ultimately increased.

Surfactants can be included in the water to produce a gas foam to reduce gas mobility and lessen fingering but the problem of water mobility remains. Thickners can be added to the water to reduce water mobility but this increases the ratio of the mobility of the gas in relation to the water and can in fact make fingering worse It is an object of the present invention to provide improved enhanced oil recovery using soluble or miscible fluids for recovery of oil deposits from mature oil reservoirs, which, among other things, overcomes some of the problems set forth above.

BRIEF DESCRIPTION OF THE INVENTION

The present invention is a method for improved recovery of oil from subterranean hydrocarbon-bearing reservoir by effecting simultaneous mobility and profile control in continuous soluble or miscible gas flooding which includes injecting into the reservoir an aqueous solution of a water-soluble polymer in combination with a stable surfactant, followed by injecting a soluble gas or a miscible gas under pressure sufficient to effect miscibility with the hydrocarbon deposits. Meanwhile, the hydrocarbon values are continuously recovered at a producing well of the reservoir. The injected aqueous solution is preferably introduced as a slug which is from about 0.05 pore volume to about 1.0 pore volume of the portion of the reservoir affected by the pattern, and most preferably is from about 0.05 to about 0.15 of the pore volume of the reservoir. This aqueous solution injection can be done prior to the start of gas injection or after a portion of the gas has been injected.

Following injection of sufficient aqueous solution and gas to achieve oil mobilization a drive fluid may be used to displace the oil and previously injected fluids towards the production well(s). This drive solution can be a gas such as air, nitrogen, combustion gas, flue gas, separation gas, natural gas, carbon dioxide or mixtures thereof, or water or brine.

The polymer used in the present invention can be selected from the group consisting of naturally occurring biopolymers such as polysaccharides, and synthetic polymers such as polyacrylamides. One polymer which can be used is an ionic polysaccharide produced by the bacteria of the genus Xanthamonus. Other polymers which can be used include polyethylene oxides, polyvinyl pyrrolidone, and copolymers thereof. Many other water-soluble polymers may be used with this invention, however. Other polymers can include gels such as cross-linked biopolymers and polyacrylamide gels which are partially hydrolyzed and cross-linked.

The polymer can be included in the solution in an amount of from about 250 ppm to about 4000 ppm, and preferably the concentration can be from about 500 ppm to about 1000 ppm.

Also included in the aqueous injection solution is a surfactant which can be any surfactant stable at reservoir conditions and can include cationic, anionic, and nonionic surfactants. For example, cationic surfactants can include those quaternary ammonium salts which are used as surfactants, the nonionic surfactants can include polyoxyethylene alkylphenols, while the anionic surfactants can include alcohol ethoxylates, alpha-olefin sulfonates, alcohol ethoxysulfates, and alcohol ethoxysulfonates. These surfactants should be foam formers (not film-formers on the reservoir rock) and be chemically and thermally stable under reservoir conditions. The surfactant can be present in the aqueous solution in a concentration of from about 0.05% to about 2% and is preferably present in an amount of from about 0.05% to about 0.5%.

A further preferred embodiment of the invention includes repeating the steps of injection of the aqueous solution and injection of the $CO_2$ sequentially as set forth above, starting with either step.

The present invention also includes the composition for use as an injection solution for soluble or miscible gas flooding and tertiary oil recovery systems as set forth above.

As a result of the present invention there is provided a method and composition for obtaining improved enhanced oil recovery by use of very low concentrations of polymers in combination with surfactants. These combinations can simultaneously effect mobility control (which is demonstrated in laboratory experiments by delayed gas 20 breakthrough) while at the same time enhance profile control (utility for which can be reasonably inferred from laboratory experiments by increased pressure drops).

For better understanding of the present invention, together with other and further objects, reference is made to the detailed description of the invention taken in conjunction with the examples, and its scope will be pointed out in the appended claims.

DESCRIPTION OF THE INVENTION

In carrying out the invention, a subterranean, oil-containing formation is penetrated by at least one injection well and at least one spaced-apart production well in fluid communication with a substantial portion of the formation. The injection and production wells are completed in a conventional manner, such as perforating the wells throughout the full or a substantial amount of the vertical thickness of the oil-containing formation. While recovery of the type contemplated by the present invention may be carried out by employing only two wells, it is to be understood that the invention is not limited to any particular number of wells. The invention may be practiced using a variety of well patterns as is well known in the art of oil recovery, such as an inverted five spot pattern in which an injection well is surrounded with four production wells, or in a line drive arrangement in which a series of aligned injection wells and a series of aligned production wells are utilized. Any number of wells which may be arranged according to any pattern may be applied in using the present method as illustrated in U.S. Pat. No. 3,927,716 to Burdyn, et al., the disclosure of which is hereby incorporated by reference. Either naturally occurring or artificially induced fluid communication should exist between the injection well and the production well.

The present invention is a method and composition for improving enhanced oil recovery methods by providing mobility and profile control in soluble or miscible gas flooding in order to increase sweep efficiency, maintain flow frontal stability and avoid bypassing of oil because of reservoir permeability stratification and low viscosity of gas, such as $CO_2$. In particular, it has been found that mobility control can be measured by the delay in breakthrough of the soluble or miscible gas. In tertiary oil recovery, soluble or miscible gas injection follows a water-flooding process.

Utility for profile control, on the other hand, is inferred from increased pressure drop across a sample reservoir, which shows that the frontal flow of a flood in a subterranean reservoir can be impeded in higher permeability regions. The injected aqueous solution of a water-soluble polymer in combination with a stable surfactant preferentially flows into higher permeability regions and the resulting increased pressure drop in such regions results in diverted flow into lower permeability regions and improved reservoir sweep efficiency.

EXAMPLES

Experiments were conducted in accordance with the present invention which included use of a sand pack reservoir model. Nitrogen, carbon dioxide, water, brine, and surfactant/polymer additives were pumped directly into the infeed line and subsequently into a sight glass under pressure. The sand pack included 40–325 mesh ground Berea sandstone held in place at each end by a screen and a diffuser to distribute the flow evenly. At the downstream end of the reservoir, a disc of filter paper was placed between the sand and the screen to prevent migration of fines from the pack. The pack was pressure tested with $N_2$ and evacuated. Brine was admitted to the evacuated pack to determine pore volume. The total weight of the sand in the model reservoir was about 60 grams and had a pore volume of from about 16 to about 17 milliliters, the total volume being about 38 milliliters.

The system was pressurized to the operating pressure with $N_2$. The oil used in the experiments was stock tank oil, commonly known as dead oil since it does not include dissolved gas. The brine used in the experiments contained approximately 6.24 weight percent of NaCl, 1.64 weight percent of $CaCl_2.2H_2O$ and 0.726 weight percent $MgCl_2.6H_2O$.

The operating temperature was approximately 124° F., the operating pressure was approximately 2000 psig and the liquid produced was drained from the sight glass so that the volumes of oil and water were determined therefrom. During draining steps pack isolating valves were closed and the remainder of the system was repressurized with $N_2$ before these valves were reopened.

In order to approximate tertiary recovery systems, the system was first evacuated and flooded sequentially with brine, then with an oil sample, and then with brine under reservoir temperature and pressure conditions.

In a given run, after the sample reservoir was conditioned to approximate tertiary recovery conditions, brine was injected with polymer alone, surfactant alone, or polymer/surfactant combination after which carbon dioxide was injected into the sample reservoir.

Three polymers were used. Most runs were performed with Pfizer Flocon 4800C (11% active ingredient on which concentrations reported here have been based). This material is a xanthan biopolymer having a molecular weight of about 2 million and an average effective particle diameter of about 0.4 microns. Gels were used made from Cyanamid polyacrylamide, Magnifloc 905N, approximately 1% hydrolyzed as supplied, and the third polymer was a polysaccharide Dextran T40, sold by Pharmacia Fine Chemicals, Uppsala, Sweden, which has a molecular weight of about 40,000 and a diameter of about 0.12 microns.

Three surfactants have been used in the experiments, including Alipal CD-128, an anionic (ammonium salt of a linear alcohol ethoxylate sulfate) supplied by GAF. This surfactant was obtained as a solution in 14% ethanol and 22% water and was used as is such that in the present work, 1% CD-128 is 0.64 % surfactant. A second surfactant is Igepal CO-630 which is a nonionic (nonylphenoxypoly(ethyleneoxy)ethanol with 9 ethyleneoxy repeating units) also supplied by GAF. A third surfactant was a proprietary brine tolerant two-tailed anionic, which is a branched sodium hexadecyltriethyleneoxypropane sulfonate.

$$\left(\left(\frac{.41 - .27}{.27}\right) \times 100 = 51.8\%\right).$$

Interestingly, it is noted that in Run 5 (gel-containing injection), the pressure drop is the highest, i.e. 26 psi, but the breakthrough is only 0.27 P.V. compared to 0.41 P.V. with a polymer concentration only 25% (see Run 8) that of the Run 5 injection solution.

These unusually good results have been achieved with very low concentrations of the respective components. While in the laboratory these reduced concentrations may appear to be minimal, in the field where the gross amounts of additives used can add up to a considerable amount, small percentages can result in huge savings.

Thus, while there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

I claim:

1. In a method for improved enhanced recovery of oil from a subterranean hydrocarbon-bearing reservoir by water alternating gas flooding, the improvement which comprises effecting simultaneous mobility and profile control by
    injecting into said reservoir an aqueous solution of a water-soluble polymer in combination with a stable foam-forming surfactant in an amount of from about 0.05% to 2.0% of said aqueous solution, and injecting into said reservoir a gas under pressure sufficient to effect mobility of hydrocarbon deposits, and
    continuously recovering oil at a producing well of said reservoir.

2. The method of claim 1 wherein said gas is miscible with said hydrocarbon deposits and said pressure is sufficient to effect miscibility with said hydrocarbon deposits.

3. The method of claim 1 wherein said aqueous solution comprises brine in an amount of from about 0.05 pore volume to about 1.0 pore volume of the portion of said reservoir included in the injection and production well pattern.

TABLE 1

|  | 1 | 2 | 3 | 4 | 5 | 6 | 7 | 8 | 9 |
| --- | --- | --- | --- | --- | --- | --- | --- | --- | --- |
| Polymer Content | 500 ppm Flocon | 2000 ppm Flocon | 1000 ppm Flocon | 1500 ppm Flocon | 2000 ppm Gel w/ 45 ppm Chromium | 0 | 0 | 500 ppm Flocon | 1000 ppm Flocon |
| Surfactant Content | 0 | 0 | 0 | 0 | 0 | 1% Igepal | 1% Alipal | 0.5% Alipal | 1.0% Alipal |
| $CO_2$ Breakthrough, Pore Volumes | 0.24 | 0.15 | 0.20 | 0.10 | 0.27 | 0.07 | 0.13 | 0.41 | 0.34 |
| Maximum Pressure Drops (psi) | 1.00 | 1.00 | 0.50 | 1.00 | 26.00 | 0.90 | 0.80 | 8.00 | 8.00 |
| Cumulative Oil Produced with $CO_2$ % Original Oil in Place | 51% | 45% | 60% | 18% | 60% | 30% | 13% | 81% | 47% |
| System Pressure, psig | 1965 | 1985 | 1975 | 1935 | 1965 | 1915 | 1900 | 2000 | 1950 |
| $CO_2$ Flow Rate, ml/hour | 2.00 | 2.00 | 1.67 | 2.00 | 2.00 | 2.00 | 1.50 | 5.00 | 5.50 |

As can be seen from the table above, the runs using the combination of the polymer and the surfactant had the most desirable combined laboratory demonstration of utility for field mobility and profile control, i.e., late $CO_2$ breakthrough in combination with a maximum pressure drop. For example, flooding with an injection solution of only 500 ppm of Flocon xanthan biopolymer in combination with 0.5% Alipal surfactant result in a 52% pore volume delay in $CO_2$ breakthrough over the next best $CO_2$ breakthrough 4. The method of claim 3 wherein said slug pore volume is up to about 0.15 of the portion of said reservoir included in the injection and production well pattern.

5. The method of claim 1 wherein said polymer is selected from the group consisting of biopolymer polysaccharides and polyacrylamides.

6. The method of claim 5 wherein said polymer is included in an amount of from about 250 ppm to about 4000 ppm.

7. The method of claim 6 wherein said concentration is from about 500 ppm to about 1000 ppm.

8. The method of claim 1 wherein said surfactant is selected from the group consisting of surfactant quaternary ammonium salts, polyoxyethylene alkylphenols, alcohol ethoxylates, alpha-olefin sulfonates, alcohol ethoxysulfates, and alcohol ethoxysulfonates.

9. The method of claim 1 wherein said surfactant is concentration is from about 0.05% to about 0.5%.

10. The method of claim 1 which further comprises injection of a drive fluid selected from the group consisting of air, nitrogen, combustion gas, flue gas, separation gas, natural gas, carbon dioxide, and mixtures thereof whereby oil and previously injected fluids are displaced towards said production well.

11. The method of claim 1 wherein said aqueous solution injection and said gas injecting are sequentially repeated.

* * * * *